United States Patent [19]

Itoh et al.

[11] Patent Number: 4,689,745

[45] Date of Patent: Aug. 25, 1987

[54] APPARATUS FOR CONTROLLING CONTINUOUSLY VARIABLE TRANSMISSION USED IN VEHICLE

[75] Inventors: Hiroshi Itoh; Mitsuru Takada, both of Toyota; Hiroshi Sasaoka, Okazaki; Takahumi Inagaki, Toyota; Susumu Masutomi, Anjo, all of Japan

[73] Assignee: Toyota Jidosha Kabushiki Kaisha, Toyota, Japan

[21] Appl. No.: 685,802

[22] Filed: Dec. 24, 1984

[30] Foreign Application Priority Data

Jul. 18, 1984 [JP] Japan ................................ 59-147676

[51] Int. Cl.$^4$ ...................... B60K 41/14; G06F 15/20; F16H 9/16
[52] U.S. Cl. .................................... 364/424.1; 74/866
[58] Field of Search ............... 364/424.1; 74/865, 866, 74/867

[56] References Cited

U.S. PATENT DOCUMENTS

| | | |
|---|---|---|
| 4,291,594 | 9/1981 | Baudoin .......................... 74/866 X |
| 4,462,275 | 7/1984 | Mohl et al. ........................ 74/866 |
| 4,515,040 | 5/1985 | Takeuchi et al. ................... 74/866 |
| 4,543,855 | 10/1985 | Oetting et al. .................... 74/865 X |
| 4,546,673 | 10/1985 | Shigematsu et al. ................ 74/866 |
| 4,569,254 | 2/1986 | Itoh et al. ........................ 74/866 |
| 4,594,916 | 6/1986 | Ito et al. ........................ 74/866 |

Primary Examiner—Felix D. Gruber
Attorney, Agent, or Firm—Oblon, Fisher, Spivak, McClelland, & Maier

[57] ABSTRACT

A continuously variable transmission (CVT) for use in a vehicle is controlled such that an actual engine speed Ne is equalized to a desired engine speed No. When a driver's request for a rapid speed change of the vehicle is addressed, a desired engine speed Ns for steady state or the desired engine speed No before the request is detected is defined as a first value Nc1. While the request continues the desired engine speed Ns for steady state which is determined by current values of vehicle running parameters is defined as a second value Nc2. The product B·(Nc2−Nc1) of a constant B and Nc2 minus Nc1 is calculated and defined as a desired engine speed during the request.

10 Claims, 8 Drawing Figures

F I G. 6
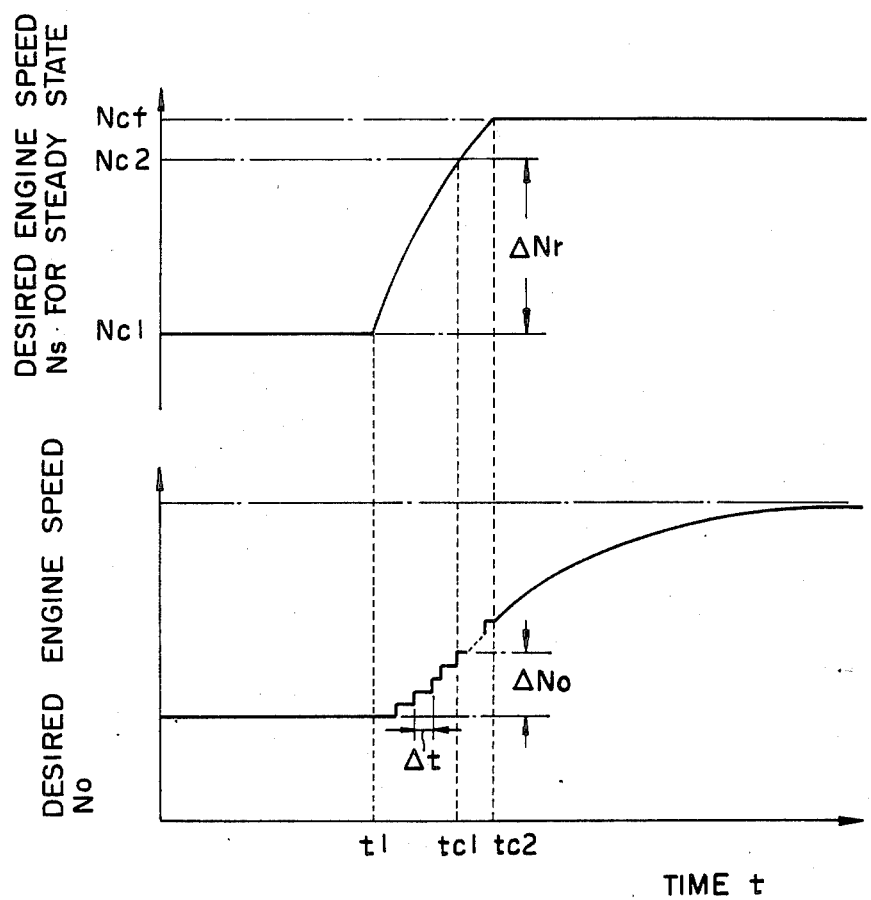

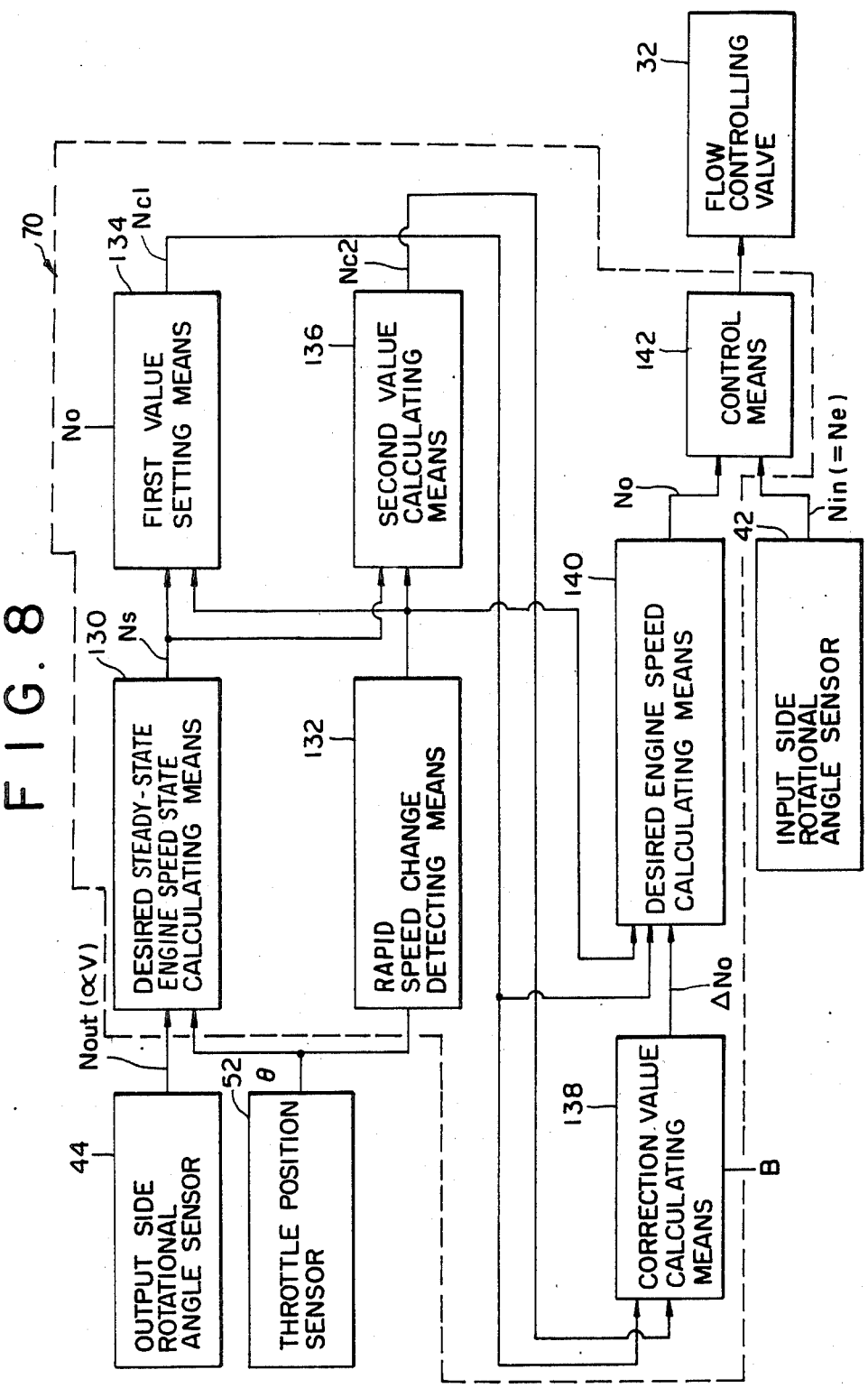

APPARATUS FOR CONTROLLING CONTINUOUSLY VARIABLE TRANSMISSION USED IN VEHICLE

CROSS-REFERENCE TO RELATED APPLICATION

U.S. patent application Ser. No. 918,058, filed Oct. 14, 1986.

BACKGROUND OF THE INVENTION

1. Field of the Invention

This invention relates to an apparatus for controlling a continuously variable transmission (hereinafter referred to as "CVT") used for a transmission of an engine power.

2. Description of the Prior Art

In U.S. patent Ser. No. 4,595,916 corresponding to Japanese Patent Application No. 58-17550, the assignee of the present application disclosed a CVT controlling apparatus which sets a desired engine speed in a transient running condition of a vehicle, which is different from a desired engine speed used in a steady running state of the vehicles. According to that controlling apparatus, when an intake throttle position $\theta$ is abruptly changed, a desired steady-state engine speed No is held at a desired engine speed Ns before the change in $\theta$, for a predetermined time Ta after the commencement of that change and is changed in steps by an amount equal to a product B·$\Delta$Ns of a difference $\Delta$Ns between the desired steady-state engine speeds Ns before and after the change in $\theta$, and a constant B (provided $0 < B < 1$) after the predetermined time Ta has elapsed. This is intended to improve the response of the engine. Thereafter the desired engine speed No is gradually changed toward the steady-state engine speed which corresponds to the newly established throttle position Ns after the change in $\theta$.

The predetermined time Ta is provided to confirm whether or not a driver's intention or request for acceleration or deceleration of the vehicle is true. However, an inconvenience is encountered since the presence of the predetermined time Ta gives an impression of delayed acceleration to the driven when an abrupt acceleration requiring a kick-down of the transmission is desired by the driver. Also, when the driver depresses an accelerator pedal for a time more than the predetermined time Ta, the stepping change in No may be less than an optimum value, causing insufficient initial acceleration of the vehicle.

On the other hand, in U.S. patent Ser. No. 918,058 filed Oct. 14, 1986, which is a continuation-in-part application of parent application Ser. No. 661,813 filed Oct. 17, 1984, claiming the priority of Japanese Patent Application No. 58-194191 filed by the assignee, there is shown a control apparatus wherein the desired engine speed No is abruptly changed, at time intervals of $\Delta$t [$\Delta$t is a time necessary for converting an analog output of a throttle position sensor to digital value with an A/D (analog/digital) converter or a multiple] of that time, for a first time span following the predetermined time Ta (including Ta=0). After the passage of the first time No span, the desired engine speed is gently changed toward Ns corresponding to the newly established throttle position $\theta$. In this case, the variation $\Delta$No in No for the unit time $\Delta$t within the first time span is a product B·$\Delta$Nr of a reference value $\Delta$Nr and said constant B. The difference between Ns before and after $\Delta$t, the difference between the present Ns and No before $\Delta$t, or the difference between the present Ns and the actual engine speed Ne are selected as the reference value $\Delta$Nr. However, since the constant B is preset to a value adapted to a variation $\Delta\theta$ in $\theta$ before and after the change in $\theta$, the desired engine speed No within the first time span is disadvantageously gradually deviated from an optimum value.

SUMMARY OF THE INVENTION

An object of the present invention is to provide an apparatus for controlling a CVT of a vehicle wherein a desired engine speed in a transient condition of the vehicle is suitably determined without giving to a driver a poor feeling (like a bad response of a vehicle) during a period where an abrupt speed change is required or requested.

The above object may be achieved according to the present invention, which provides an apparatus for controlling the CVT in a vehicle which controls an actual speed Ne of the engine or the speed ratio e of the CVT such that the actual engine speed Ne coincides with a desired engine speed No the apparatus comprising:

a means for calculating a desired steady-state engine speed Ns in relation to the running parameters of the vehicle, the means for detecting the request for an abrupt speed change of the vehicle, a means for setting as a first value Nc1 the desired steady-state engine speed Ns or the desired engine speed No stablished before the request for abrupt speed change is detected, a means for calculating as a second value Nc2 the desired steady-state engine speed Ns for steady state corresponding to the current running parameter of the vehicle, a mens for calculating a product of a constant B and a difference Nc2−Nc1, which is used as a correction value $\Delta$No and a means for setting Nc1+$\Delta$No as the desired engine speed No in a period while the request for the abrupt speed change is detected.

Thus, the desired engine speeds No at respective times in the period when the request for the abrupt speed change, i.e., rapid acceleration or deceleration is detected, are obtained as a sum of the first value Nc1 and the correction value $\Delta$No which is the product B·$\Delta$Nr, where $\Delta$Nr is a difference between the first value Nc1 (Ns determined by the vehicle running parameters at the time of detection of the abrupt speed change) and the second value Nc2 (Ns determined by the present vehicle running parameters), and where the constant B is determined based on the variations of running parameters during the requested abrupt speed change.

Also, the detection of the final values of the running parameters accompanying the request for abrupt speed change is not needed, so that the desired engine speed No is set so that in the transient condition immediately after the request for abrupt acceleration is addressed whereby a satisfactory driver feeling of the vehicle is obtained.

Preferably, the desired steady-state speed Ns is calculated on the basis of a throttle position $\theta$ of an intake throttle valve of the engine, or the throttle position $\theta$ and a speed V of the vehicle.

Preferably, the request for abrupt speed change is detected based on the throttle position $\theta$, and when the absolute value $|\Delta\theta|$ of a difference $\Delta\theta$ between the present throttle position $\theta$ and the throttle position $\theta$ a predetermined time Tc before the present time exceeds a predetermined value X1 for example, the request for abrupt speed change is judged to exist.

BRIEF DESCRIPTION OF THE DRAWINGS

The above and other objects, features and advantages of the present invention will be better understood by reading the following description of a preferred embodiment of the invention, when considered in connection with the accompanying drawings, in which:

FIG. 6 is a view showing a change of the desired engine speed as a function of time when abrupt acceleration of the vehicle is required;

FIG. 8 is a functional block diagram showing a control apparatus according to the present invention.

DESCRIPTION OF THE PREFERRED EMBODIMENTS

Figure 1:
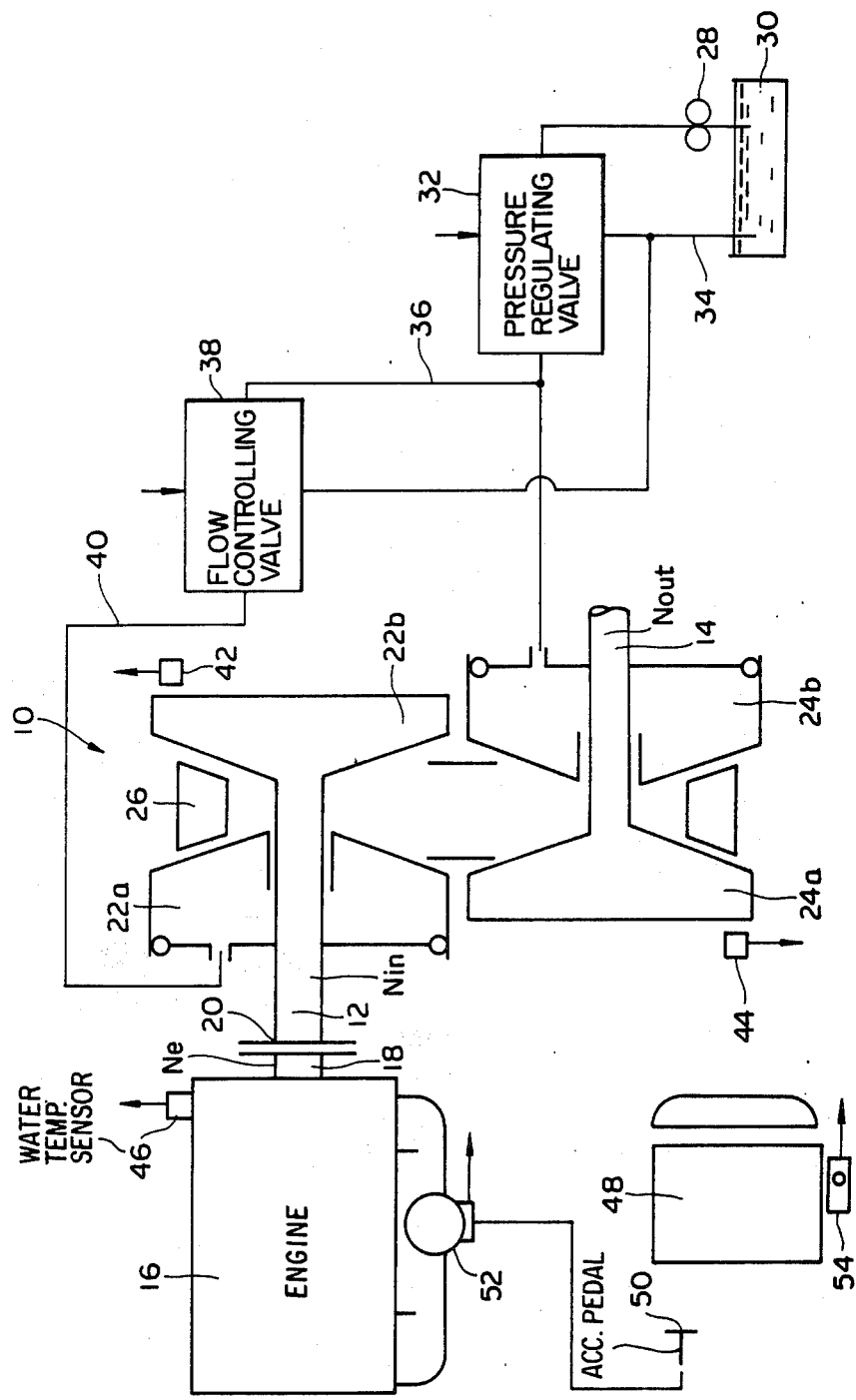
FIG. 1 is a schematic view showing the whole arrangement of a CVT connection to an engine of a vehicle.

In FIG. 1, a CVT 10 is provided with an input shaft 12 and an output shaft 14 parallel to each other. The input shaft 12 is provided coaxially with a crankshaft 18 of an engine 16 and connected to the crankshaft 18 through a clutch 20. Input side pulleys 22a, 22b are provided in opposed relation with each other, one input side pulley 22a being axially movable on the input shaft 12 as a movable pulley and rotatable therewith and the other input side pulley 22b being secured to the input shaft 12 as a fixed pulley. Similarly, output side pulleys 24a, 24b are provided opposite to each other, one output side pulley 24a being secured to he output shaft 14 as a fixed pulley and the other output side pulley 24b being axially movable on the output shaft 14 as a movable pulley and rotatable therewith. Opposed surfaces of the input and output side pulleys 22a, 22b and 24a, 24b are tapered and a belt 26 having an equilateral trapezoidal section is provided to connect the input and output side pulleys 22a, 22b and 24a, 24b. An oil pump 28 delivers oil from an oil reservoir 30 to a relief valve 32 which is constituted by an electromagnetic relief valve to control a line pressure in an oil path 36 by varying a relief amount of oil discharged into a drain 34, so that the line regulated pressure in the oil path 36 is applied to a hydraulic cylinder of the output side pulley 24b and a flow controlling valve 38 of the output side pulley 24b. The flow controlling valve 38 controls an oil flow supplied from the oil path 36 to an oil path 40 connected to a hydraulic cylinder of the input side pulley 22a, and an oil flow drained from the oil path 40 to the drain 34. The press forces of the input and output side pulleys 22a, 22b and 24a, 24b against the belt 26 are controlled by the oil pressure in the input side hydraulic cylinder. The output side hydraulic cylinder functions to vary the radii of the belt 26 engaging the tapered surfaces of the input and output side pulleys 22a, 22b and 24a, 24b in relation to the above forces, namely, a tension of the belt 26. As a result, the speed ratio e (=Nout/Nin, where Nout is the rotational speed of the output shaft 14 and Nin the rotational speed of the input shaft 12 of the CVT is varied. In this embodiment, Nin is equal to the engine speed Ne). That is, when the speed ratio e is increased, oil is supplied from the flow controlling valve 38 to the input side hydraulic cylinder and when the speed rato e is decreased, oil is drained from the input side hydraulic cylinder through the flow controlling valve 38. The line pressure in the output side hydraulic cylinder is controlled to a necessary minimum value to avoid a slip of the belt 26 and ensure suitable power transmission, for the purpose of minimizing a power loss of the oil pump 28, and the speed ratio e is controlled by oil pressure in the input side hydraulic cylinder. Further, while oil pressure in the input side hydraulic cylinder $\leq$ oil pressure in the output side hydraulic cylinder, the press force of the input side pulleys 22a, 22b can be made larger than that of the output side pulleys 24a, 24b, since the pressure receiving area of the input side hydraulic cylinder is greater than that of the output side hydraulic cylinder. An input side rotational angle sensor 42 and an output side rotational angle sensor 44 detect respectively the rotational speeds Nin, Nout of the input shaft 12 and the output shaft 14, and a water temperature sensor 46 detects cooling water temperature in the engine 16. Adjacent to a driver's seat 48 is provided an accelerator pedal 50 connected with a throttle valve in an intake path manifold of the engine 16. A throttle position sensor 52 detects a throttle position $\theta$ of the throttle valve. A shift position sensor 54 detects the position of a shift lever near the driver's seat.

Figure 2:
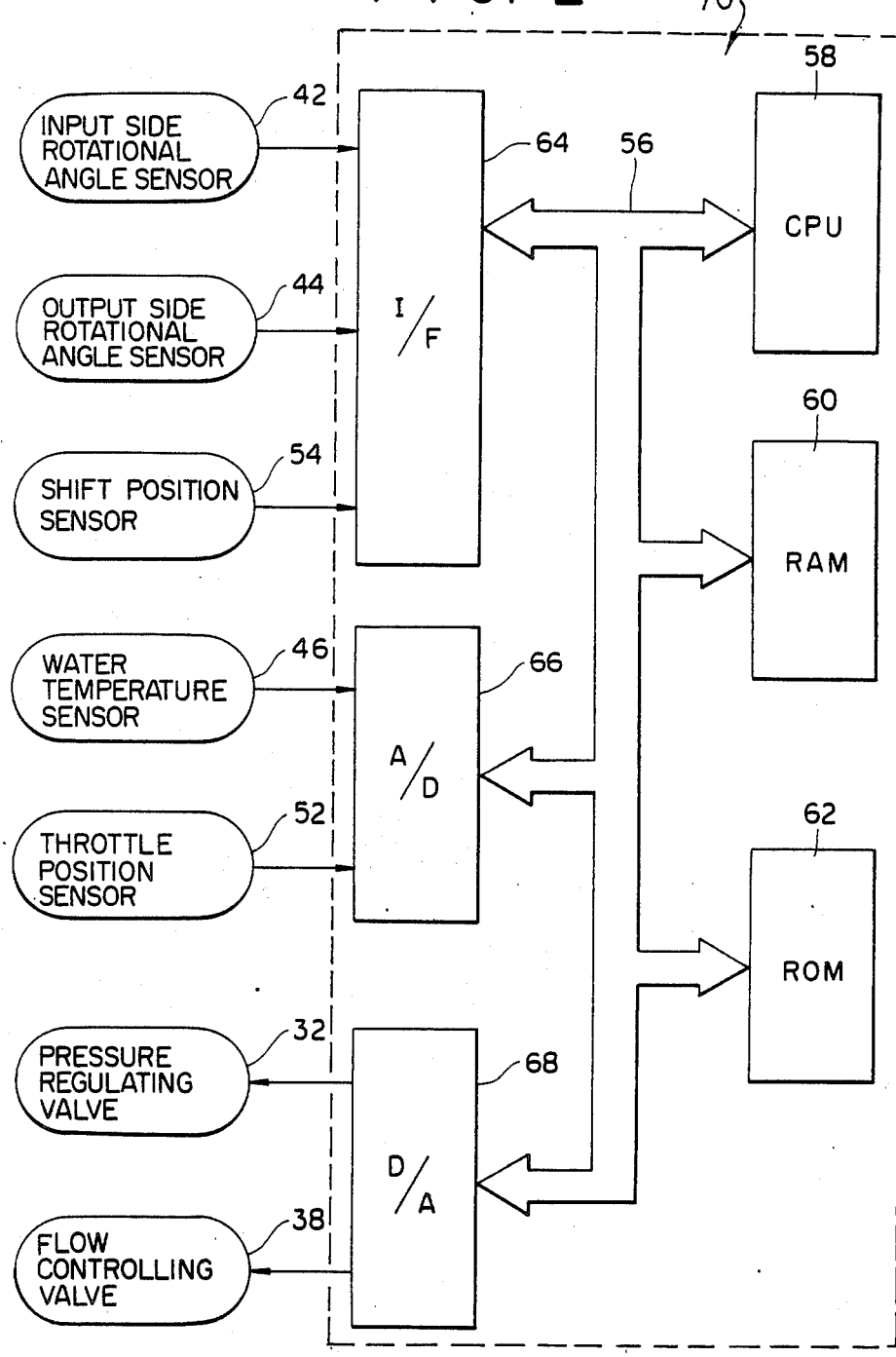
FIG. 2 is a block diagram showing an electronic control unit for the CVT of FIG. 1.

FIG. 2 is a block diagram showing an electronic control unit of the CVT. An address data bus 56 interconnects CPU 58, RAM 60, ROM 62, I/F (interface) 64, A/D (analog/digital converter) 66 and D/A (digital/analog converter) 68. The I/F 64 receives pulse signals from the input side rotational angle sensor 42, the output side rotational angle sensor 44 and the shift position sensor 54, and the A/D 66 receives analog signals from the water temperature sensor 46 and the throttle position sensor 52. The D/A 68 generates pulse signal outputs to control the relief valve 32 and the flow controlling valve 38. In the instant illustrated embodiment, the elements, 56, 58, 60, 62, 64, 66 and 68 constitute a controller 70, which cooperates with the sensors 42, 44, 46, 52 and 54, and the valves 32, 38, to constitute an apparatus for controlling the CVT.

Figure 3:
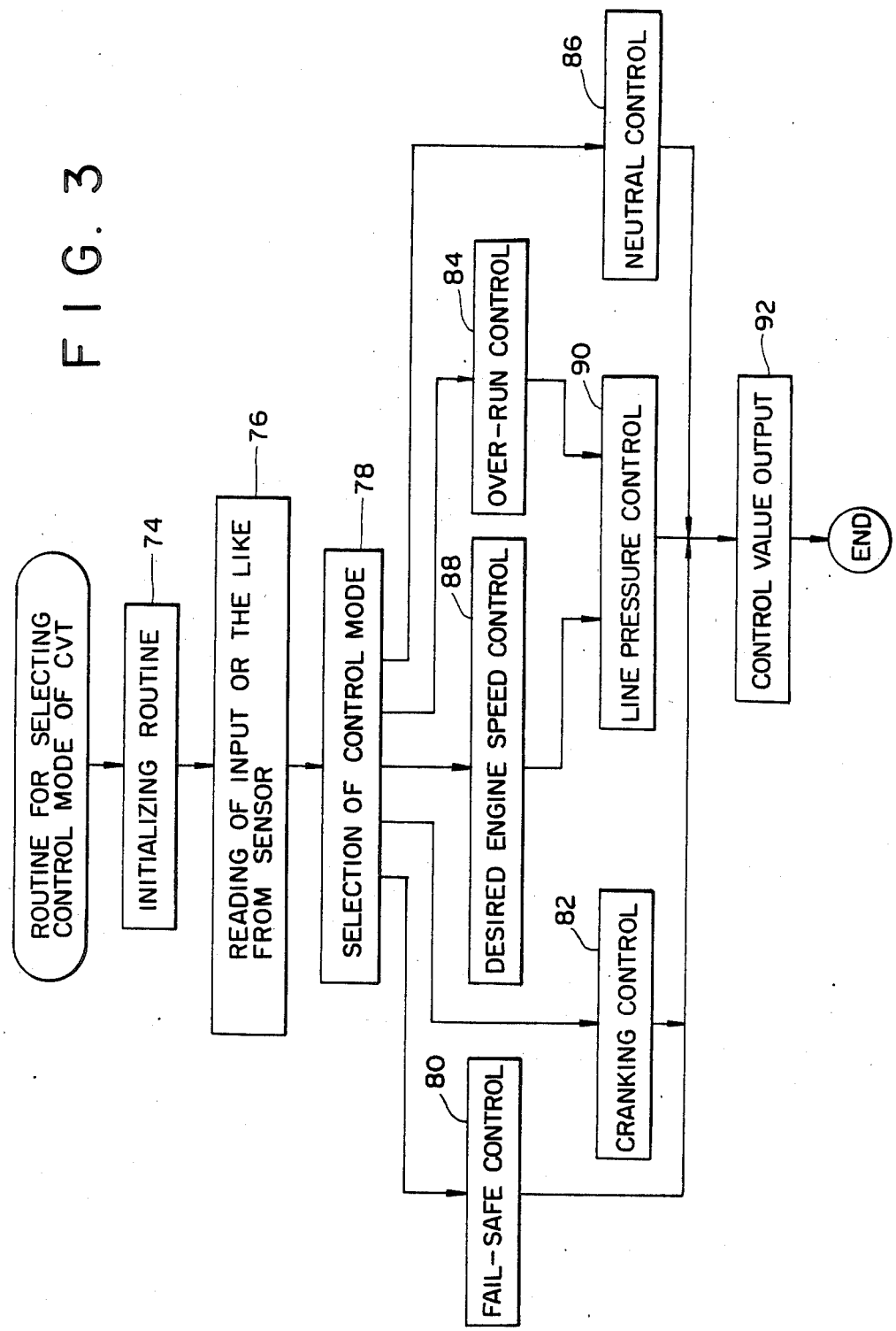
FIG. 3 is a flow chart showing a routine for selecting a control pattern of the CVT.

FIG. 3 is a flow chart showing a control pattern selecting routine of the CVT. In step 74 is executed an initializing routine in which various data are set to proper initial values. In step 76 the CVT 58 receives input signals and data from the various sensors. In step 78 the CVT 58 selects one of a plurality of control modes based on the inputs received in step 76. According to the read inputs and data, a fail-safe control mode in step 80 is executed if any abnormality is found in the engine, sensors or the like, a cranking control in step 82 is executed during starting of the engine, over-run control in step 84 is executed during over-run, a neutral control in step 86 is executed when the shift lever is in the neutral position and a desired engine speed control executed in step 88 is executed in other cases. With the respective controls in steps 80 to 88, the proper speed ratio e of the CVT 10 is calculated. In the over-run control in step 84 and the desired engine speed control in step 88, the line pressure is also controlled in step 90 to calculate the proper line pressure Pl. In step 92 are generated the control values corresponding to the calculated values in steps 80 to 90.

Figure 4:
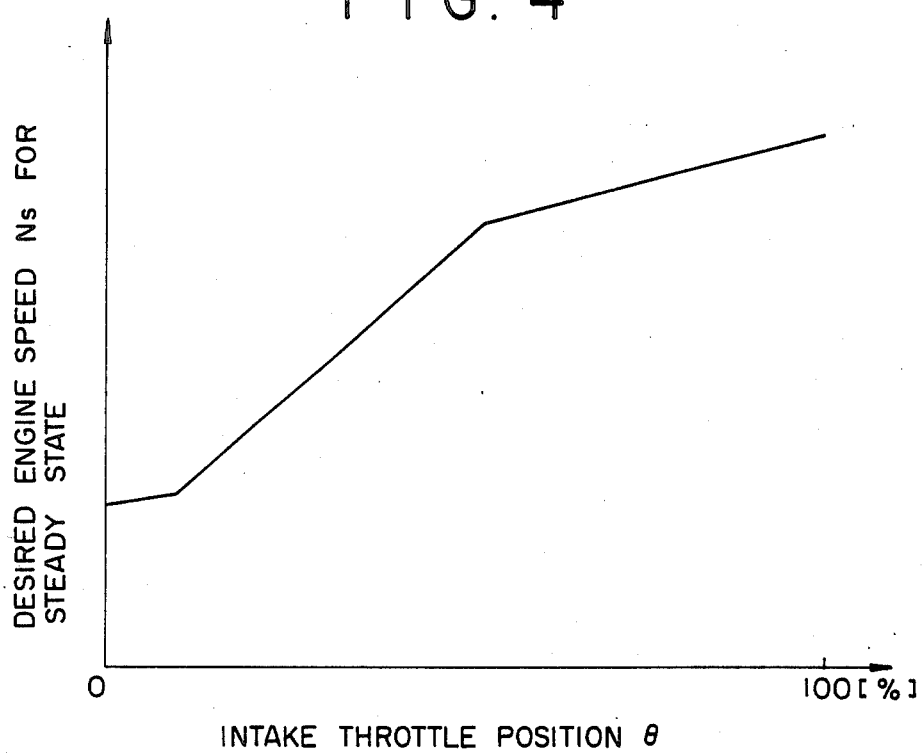
FIGS. 4 and 5 are graphs showing the characteristics of a desired engine speed used for a steady state running of the vehicle.

FIG. 4 shows a change in the desired engine speed Ns for a steady state running of the vehicle as a function of the intake throttle position $\theta$. The throttle position $\theta$ is increased as a function of a pedal position of the accelerator pedal 50. The engine speed Ne in a steady state of the vehicle at which the engine output corresponding to the throttle position $\theta$ is generated with a minimum specific fuel consumption, is set as the desired engine speed Ns for steady state.

Figure 5:
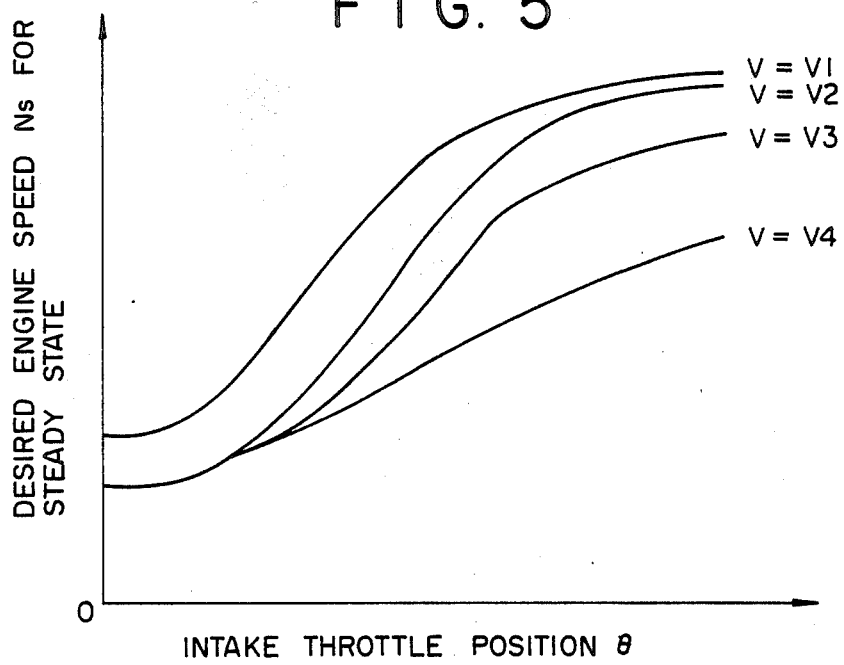

FIG. 5 shows another example of a relation between the desired steady-state engine speed Ns and the throttle position. Since necessary engine output varies with vehicle speed V, the desired engine speed Ns shown in FIG. 5 is corrected in relation to the vehicle speed V on the basis of Ns in FIG. 4, provided V1>V2>V3>V4.

FIG. 6 shows a change in the desired engine speed No when a driver abruptly depresses the accelerator pedal 50. The desired engine speed No is renewed every passage of time $\Delta t$, where $\Delta t$ is a time required for the A/D 66 to convert the analog output of the throttle position sensor 52 into a digital value or a multiple of that time.

Since the change in the throttle position $\theta$ before point of time t1 is gentle, the desired engine speed No is calculated from the following formula;

$$No = Mp' + D1 \cdot (Ns - No') \pm D2 \quad (1)$$

where No' is the desired engine speed No before renewal, i.e., the calculatd speed No.

Ns is the desired steady-state engine speed corresponding to the present parameters ($\theta$ in FIG. 4 and $\theta$, V in FIG. 5). D1, D2 are constants. Further, $D1 \cdot (Ns - No') \pm D2 \approx 21/100(Ns - No')$, and No calculated before time t2 according to the formula (1) is considered equal to Ns.

The throttle position $\theta$ is abruptly increased in a period between t1 and t2. Accordingly, Ns is also abruptly increased. As soon as this abrupt speed change has been commenced at time t1, Ns or No immediately or slightly before the time t1 is detected and set as a first value Nc1. In the embodiment in FIG. 7 which will be described later, Ns for $\theta y1$ is set as the first value Nc1 so that this value Nc1 is equal to a value which was active Ns (n−1) $\Delta t$ before t1. Further, as described previously, No≃Ns.

A method of calculating the desired engine speed No within a period from time t1 to t2 will be described. The desired engine speed Ns corresponding to $\theta$ or ($\theta$ and V) at a point of time tc1 is set as a second value Nc2. A difference Nc2−Nc1 is set as a reference value $\Delta$Nr, and a product B·$\Delta$Nr, i.e., a constant B multiplied by the reference value $\Delta$Nr is set as a correction value $\Delta$No. Finally, a sum Nc1+$\Delta$No is set as the desired engine speed No at time tc1. That is, No is calculated from the following formula; $No = Nc1 + B \cdot (Nc2 - Nc1)$ (2)

The change in the throttle position $\theta$ is completed at point of time t2 and accordingly, Ns is also held constant of and after time t2. Assuming the desired engine speed Ns corresponding to the running parameter value at time t2 is Ncf, the desired engine speed No is defined by the formula (1) or another formula to change the speed No gradually toward Ncd at and after time t2. (In this case D1, D2 values in the formula (1) are different from those used in steady state. The gradient of the curve is increased with the value D1 is.) As a result, the desired engine speeds No which are determined within the period from t1 to t2 are free from cumulative errors produced every $\Delta t$, as experienced in the apparatus disclosed in the previously identified U.S. patent application Ser. No. 918,058 corresponding to Japanese Patent Application No. 58-194191. Thus, the correction value $\Delta$No is added to the first value Nc1, to obtain the desired engine speed No in each cycle of calculation.

Figure 7:
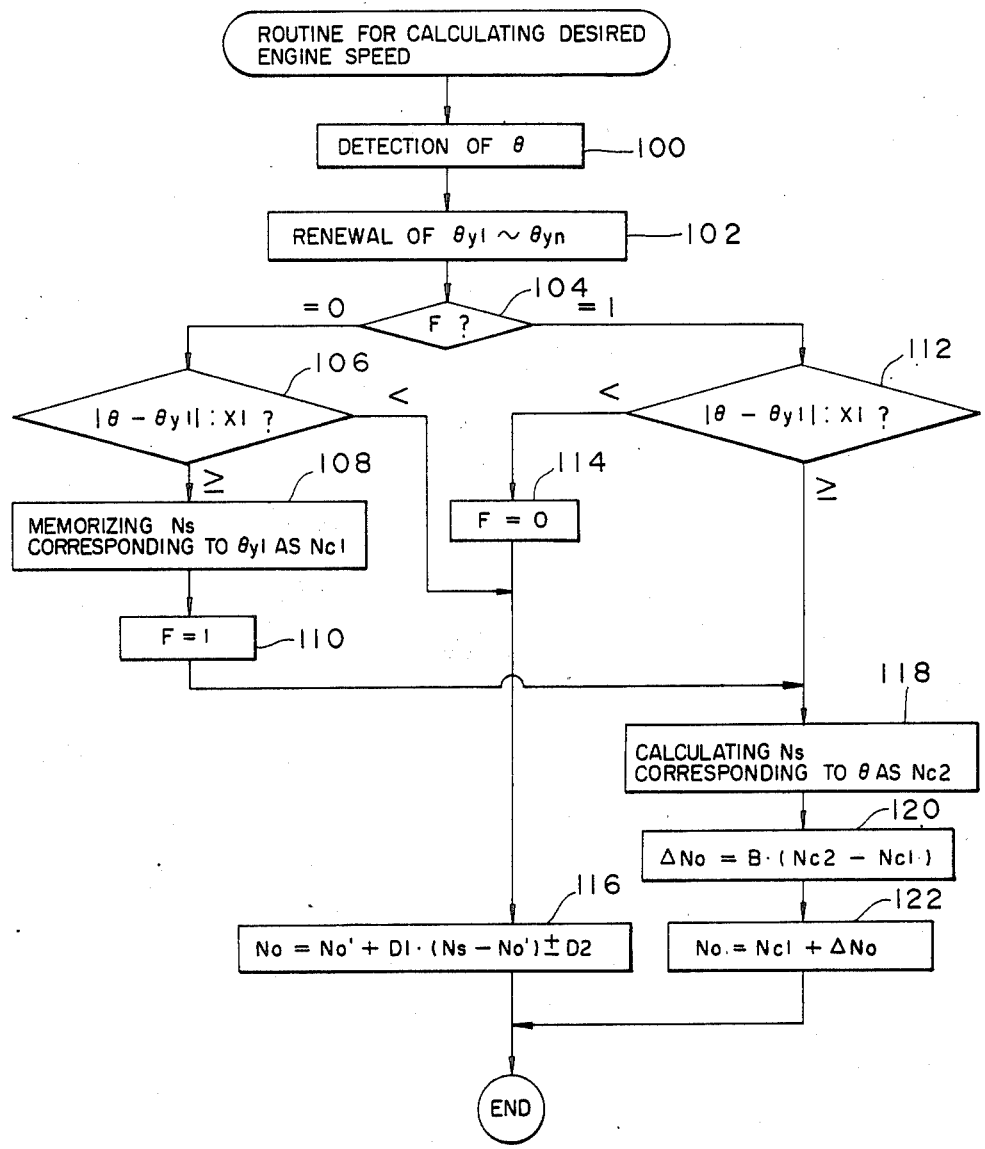
FIG. 7 is a flow chart showing a routine for calculating the desired engine speed.

FIG. 7 is a flow chart showing a routine for calculating the desired engine speed according to the description of FIG. 6. This routine is executed at the interval of time $\Delta t$.

Initially, the intake throttle position $\theta$ is detected (step 100) to renew data $\theta y1, \theta y2, \ldots \theta yn$ (step 102). That is, $\theta y2$ is substituted for $\theta y1$, $\theta y3$ is substituted for $\theta y2, \ldots \theta yn$ substituted for $\theta yn-1$ and $\theta$ substituted for $\theta yn$. Accordingly, $\theta y1$ becomes $\theta$ before time Tc, $\theta y2$ becomes $\theta$ before time (Tc−$\theta t$), ... $\theta yn-1$ becomes $\theta$ before time $\Delta t$ and $\theta yn$ becomes $\theta$ at the present time. The intake throttle position $\theta$ is detected at every $\Delta t$, to time Tc to the present, and is stored in the RAM 60. Each data $\theta$ is erased when time (Tc−$\Delta t$). has elapsed.

Next, the CVT 58 checks to see the current state of a flag F (step 104). As will be described later, when the request for an abrupt speed change is addressed, the flag F is set to "1", and when the request for the abrupt speed change is completed, the flag F is reset to "0". When the flag F is in the "0" state an abrupt speed change has not been detected in the preceeding $\Delta t$, that is, when the absolute value $|\theta - \theta y1|$ of a difference $\theta - \theta y1$ between the present value $\theta$ and the value $\theta y1$ at time Tc is compard with a predetermined value X1 (step 106). When $|\theta - \theta y1| < X1$, that is, in a period when request for an abrupt speed change is not detected, the desired engine speed No is calculated in step 116 according to formula (1). When $|\theta - \theta y1| \leq X1$, that is, when the request for an abrupt speed change is detected, the desired engine speed Ns corresponding to $\theta y1$ is stored as a first value Nc1 (step 108), while and the flag F is set to "1" (step 110). Then the desired engine speed No is calculated according to formula (2) (steps 118, 120, 122).

When F=1, the flag F is in the "1" state, that is, when an abrupt speed change has been detected in the preceeding control cycle, an absolute value $|\theta - \theta y1|$ is compared with X1 (step 112). When $|\theta - \theta y1| < X1$, that is, when the abrupt acceleration has been already completed, the flag F is reset to "0" (step 114) and No is calculated according to the formula (1) (step 116). When $|\theta - \theta y1| \leq X1$, that is, when the abrupt speed change is still continued, No is calculated according to the formula (2) (step 118, 120, 122).

FIG. 8 is a functional block diagram showing the control apparatus of the present embodiment, which has the previously described controller 70. The output side rotational speed Nout of the CVT 10 detected by the output side rotational angle sensor 44 is proportional to the vehicle speed V. A desired steady-state engine speed for calculating means 130 of the controller 70, which is connected to the sensor 44, calculates the desired engine speed Ns, the vehicle speed V and the throttle position $\theta$, and according to the relation shown in the graphs in FIGS. 4 or 5. An abrupt speed change detecting means 132 is connected to the throttle position sensor 52, to detect a request for an abrupt speed change, based on a change in the throttle position θ. A first value setting means 134 is connected to the calculating means 130 an the request for an abrupt speed change is detected by the setting means 134, as the first value Nc1, the desired steady-state engine speed Ns or desired engine speed No is established upon detection of the request for an abrupt speed change. A second value calculating means 136 connected to the calculating and detecting means 130, 132 calculates the desired engine speed Ns at the present time as the second value Nc2. A correction value calculating means 138 connected to the setting means 134 and calculating means 136 calculates the product B·(Nc2−Nc1), which is the constant B multiplied by Nc2−Nc1. This product is used as the correction value ΔNo. A desired engine speed calculating means 140 is connected to the detecting means 132, setting means 134 and calculating means 138. The calculating means 140 functions to substitute Nc1+Δ No for the currently established engine speed No while the request for an abrupt speed change is detected. A control means 142 connected to the calculating means 138 and input side rotational angle sensor 42, controls the flow controlling valve 32 based on the difference between the newly established desired engine speed No, and the actual engine speed Ne and changes and speed ratio e of the CVT 10 such that the actual speed Ne coincides with the desired speed.

It will be apparent to those skilled in the art that various modifications and variations may be made in the invention without departing from the scope or spirit of the invention.

What is claimed as new and desired to be secured by letters patent of the United States is:

1. An apparatus for controlling a continuously variable transmission used in a vehicle having an engine, which controls an actual speed Ne of the engine or a speed ratio of the continuously variable transmission such that the actual engine speed Ne coincides with a desired engine speed No, comprising:
    a processor means for calculating a desired steady-state speed Ns of said engine for steady running of said vehicle, in relation to at least one running parameter of the vehicle wherein said processor is for:
        detecting a request of a driver of the vehicle for an abrupt speed change of the vehicle;
        setting as a first value Nc1 one of the desired steady-state engine speed Ns or the desired engine speed No which has been established immediately before or upon detection of said request for the abrupt speed change;
        calculating as a second value Nc2 the desired steady-state engine speed Ns corresponding to a present value of one of said at least one running parameter of the vehicle;
        calculating a product of a constant B and a difference between said second value Nc2 and said first value Nc1, said product being used as a correction value ΔNo;
        setting a sum of said first value Nc1 and said correction value ΔNo, as said desired engine speed No, while request for the abrupt speed change is detected; and
        said processor further has means for outputting a signal indicative of the line pressure necessary to control said continuously variable transmission and controlled value means coupled to said processor means and controlled by said outputted signal.

2. An apparatus for controlling a continuously variable transmission as defined in claim 1, wherein said at least one running parameter of the vehicle for calculating the desired steady-state engine speed Ns is a throttle position θ of an intake throttle value of the engine.

3. An apparatus for controlling a continuously variable transmission as defined in claim 1, wherein said at least one running parameter for calculating the desired steady-state engine speed Ns comprises a throttle position θ of an intake throttle valve of the engine, and a running speed V of the vehicle.

4. An apparatus for controlling a continuously variable transmission as defined in claim 1, wherein said request for the abrupt speed change is detected by a sensor for detecting a throttle position θ of an intake throttle valve of the engine.

5. An apparatus for controlling a continuously variable transmission as defined in claim 4, wherein said processor for detecting a request for an abrupt speed change judges that said request exists when an absolute value $|\Delta\theta|$ of a difference $\Delta\theta$ between a present value of said throttle position θ and a value of said throttle position θ a predetermined time Tc before detection of said present value exceeds a predetermined value X1.

6. A method of controlling a continuously variable transmission of an automotive vehicle having an engine, wherein the transmission is controlled such that an actual Ne of the engine coincides with a desired engine speed No, comprising the steps of:
    determining a desired steady-state speed Ns of said engine for steady running of said vehicle, based on at least one running parameter of the vehicle, and according to a predetermined relationship between said desired steady-state engine speed Ns and said at least one running parameter;
    detecting an abrupt increase in a currently required output of said engine;
    setting as a first value Nc1 one of the desired steady-state engine speed Ns or the desired engine speed No which has been established immediately before or upon detection of said abrupt increase in the currently required output of the engine;
    setting as a second value Nc2 the desired steady-state engine speed Ns corresponding to a present value of one of said at least one running parameter of the vehicle;
    calculating a correction value ΔNo by calculating a product of a constant B and a difference Nc2−Nc1 between said first and second values Nc2 and Nc1; and
    controlling said continuously variable transmission by using a sum of said first value Nc1 and said correction value ΔNo as said desired engine speed No while said abrupt increase in the currently required output of the engine is detected as the controlling signal.

7. A method as defined in claim 6, wherein said desired steady-state engine speed Ns is determined based on a throttle position θ of a throttle valve of the engine, according to a predetermined relation between said desired steady-state engine speed Ns and said throttle position θ.

8. A method as defined in claim 6, wherein said desired steady-state engine speed Ns is determined based on a throttle position θ of a throttle valve of the engine and a running speed V of the vehicle, and according to a predetermined relationship among said desired steady-state engine speed Ns, said throttle position $\theta$, and said running speed v.

9. A method as defined in claim 6, wherein said abrupt increase in the currently required output of the engine is detected by sensing an amount of change in a throttle position $\theta$ of a throttle valve of the engine.

10. A method as defined in claim 7, wherein said abrupt increase is determined to exist when a difference of two values of said throttle position $\theta$ at the commencement and end of a predetermined time interval Tc exceeds a predetermined upper limit X1.

* * * * *